(12) United States Patent
Strong

US011783325B1

(10) Patent No.: US 11,783,325 B1
(45) Date of Patent: Oct. 10, 2023

(54) REMOVAL PROBABILITY-BASED WEIGHTING FOR RESOURCE ACCESS

(71) Applicant: Amazon Technologies, Inc., Seattle, WA (US)

(72) Inventor: Homer Strong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/213,513

(22) Filed: Mar. 26, 2021

(51) Int. Cl.
*H04L 9/40* (2022.01)
*G06Q 20/38* (2012.01)
*G06N 7/01* (2023.01)

(52) U.S. Cl.
CPC ............ G06Q 20/382 (2013.01); G06N 7/01 (2023.01); H04L 63/102 (2013.01)

(58) Field of Classification Search
CPC ...... G06F 9/547; G06F 16/256; G06F 21/316; G06F 21/602; G06F 21/6218; G06F 16/951; G06F 21/604; G06F 21/6245; G06N 7/005; H04L 63/20; H04L 63/108; H04L 63/102
See application file for complete search history.

(56) References Cited

U.S. PATENT DOCUMENTS

| | | | |
|---|---|---|---|
| 9,336,483 B1 | 5/2016 | Abeysooriya et al. | |
| 9,356,939 B1 | 5/2016 | Gates et al. | |
| 9,781,122 B1 | 10/2017 | Wilson et al. | |
| 10,095,549 B1 * | 10/2018 | Needham | G06F 21/602 |
| 10,122,757 B1 | 11/2018 | Kruse et al. | |
| 10,581,919 B2 | 3/2020 | Kruse et al. | |
| 10,944,758 B1 * | 3/2021 | Nagargadde | G06F 21/6218 |
| 10,984,468 B1 * | 4/2021 | Hockey | G06F 16/951 |
| 10,992,657 B1 * | 4/2021 | Stevens | H04L 63/102 |
| 11,080,336 B2 | 8/2021 | Van Dusen et al. | |
| 11,218,854 B2 | 1/2022 | Raleigh et al. | |
| 11,227,055 B1 | 1/2022 | Badawy et al. | |

(Continued)

OTHER PUBLICATIONS

Busa-Fekete et al.; "An apple-to-apple comparison of Learning-to-rank algorithms in terms of Normalized Discounted Cumulative Gain"; 20th European Conf. on Artificial Intelligence: Preference Learning: Problems and Applications in AI Workshop; vol. 242; 2012; 6 pages.

(Continued)

*Primary Examiner* — Dustin Nguyen
(74) *Attorney, Agent, or Firm* — BakerHostetler

(57) ABSTRACT

A plurality of cross account resource accessibility instances may be identified in which a plurality of resources are accessible by a plurality of identities that are external to an account that controls the plurality of resources. A plurality of estimated occurrence probabilities of a plurality of links between the plurality of resources and the plurality of identities may be determined. A plurality of estimated removal probabilities of the plurality of cross account resource accessibility instances may be determined based at least in part on the plurality of estimated occurrence probabilities. A plurality of weights for the plurality of cross account resource accessibility instances may be generated based at least in part on the plurality of estimated removal probabilities. A prioritized display of a plurality of indications of the plurality of cross account resource accessibility instances may be provided based at least in part on the plurality of weights.

20 Claims, 8 Drawing Sheets

(56) References Cited

U.S. PATENT DOCUMENTS

| | | | |
|---|---|---|---|
| 2002/0165960 A1 | 11/2002 | Chan et al. | |
| 2010/0277497 A1 | 11/2010 | Dong et al. | |
| 2013/0132854 A1 | 5/2013 | Raleigh et al. | |
| 2013/0246208 A1 | 9/2013 | Jain et al. | |
| 2014/0143332 A1* | 5/2014 | Garg | G06N 7/005 709/204 |
| 2014/0181965 A1 | 6/2014 | Kling et al. | |
| 2014/0215604 A1 | 7/2014 | Giblin et al. | |
| 2014/0289846 A1 | 9/2014 | Moloian et al. | |
| 2014/0298423 A1 | 10/2014 | Moloian et al. | |
| 2014/0325646 A1* | 10/2014 | Turgeman | G06F 21/316 726/22 |
| 2016/0307191 A1* | 10/2016 | Turgeman | G06F 21/316 |
| 2017/0201850 A1 | 7/2017 | Raleigh et al. | |
| 2018/0027006 A1* | 1/2018 | Zimmermann | G06F 21/6218 726/11 |
| 2018/0196955 A1* | 7/2018 | Dageville | G06F 21/6218 |
| 2018/0365627 A1 | 12/2018 | Mansour et al. | |
| 2019/0182262 A1* | 6/2019 | Raposa | H04L 63/108 |
| 2020/0007555 A1 | 1/2020 | Jadhav et al. | |
| 2020/0067861 A1* | 2/2020 | Leddy | G06F 21/6245 |
| 2021/0117557 A1 | 4/2021 | Al-Shanqity et al. | |
| 2021/0194884 A1 | 6/2021 | Xie et al. | |
| 2021/0203687 A1 | 7/2021 | Rabin et al. | |
| 2021/0218748 A1 | 7/2021 | Morin et al. | |
| 2021/0243190 A1 | 8/2021 | Bargury et al. | |
| 2022/0078797 A1* | 3/2022 | Helms | G06F 9/547 |
| 2022/0109677 A1* | 4/2022 | Bajaria | G06F 21/604 |
| 2022/0210162 A1 | 6/2022 | Agarwwal et al. | |
| 2022/0368726 A1 | 11/2022 | Balasubramaniam et al. | |

OTHER PUBLICATIONS

Tom Fawcett; "An introduction to ROC analysis"; Pattern Recognition Letters; vol. 27; 2006; p. 861-874.

Hagberg et al.; "Exploring network structure, dynamics, and function using network"; Los Alamos National Lab; Technical Report; 2008; 6 pages.

Haveliwala et al.; "Topic-sensitive PageRank: a context-sensitive ranking algorithm for Web search"; IEEE Transactions on Knowledge and Data Engineering; vol. 15 No. 4; Jul./Aug. 2003; p. 784-796.

Liben-Nowell et al.; "The link-prediction problem for social networks"; Journal of the American Society for Information Science and Technology; vol. 58; 2007; p. 1019-1031.

Liu et al.; "Isolation Forest"; $8^{th}$ IEEE Int'l Conf. of Data Mining; 2008; p. 413-422.

Menon et al.; "Link Prediction via Matrix Factorization"; Joint European Conf. on Machine Learning and Knowledge Discovery in Databases; 2011; p. 437-452.

Pedregosa et al.; "Scikit-learn: Machine Learning in Python"; Journal of Machine Learning Research; vol. 12; 2011; p. 2825-2830.

J.R. Quinlan; "Generating production rules from decision trees"; In IJCAI; vol. 87; 1987; p. 304-307.

Radlinski et al.; "Learning diverse rankings with multi-armed bandits"; Proceedings of the $25^{th}$ Int'l Conf. on Machine Learning; 2008; p. 784-791.

Rendle et al.; "BPR: Bayesian Personalized Ranking from Implicit Feedback"; arXiv:1205.2618; 2009; p. 452-461.

D. Sculley; "Large scale learning to rank"; NIPS; 2009; 6 pages.

"Reviewing and applying recommendations"; https://cloud.google.com/iam/docs/recommender-managing; Oct. 2020; accessed Oct. 21, 2020; 5 pages.

"Enforce least privilege with recommendations"; https://cloud.google.com/iam/docs/recommender-overview; Oct. 2020; accessed Oct. 20, 2020; 13 pages.

U.S. Appl. No. 17/107,082, filed Nov. 13, 2020, Strong et al.

U.S. Appl. No. 17/104,984, filed Nov. 25, 2020, Strong.

U.S. Appl. No. 17/218,570, filed Mar. 31, 2021, Strong.

U.S. Appl. No. 17/209,782, filed Mar. 23, 2021, Strong et al.

"IAM identifers"; web.archive.org/web/20201030115949/https://docs.aws.amazon.com/IAM/latest/UserGuide/reference_identifiers.html; Amazon Web Services, Inc.; web archive from Oct. 30, 2020; accessed Dec. 10, 2021; 8 pages.

Robertson et al.; "The Probabilistic Relevance Framework: BM25 and Beyond"; Foundation and Trends in Information Retrieval; vol. 3 No. 4; 2009; p. 333-389.

Robertson et al.; "Okapi at TREC-3"; Overview of the $3^{rd}$ Text Retrieval Conf.; Jan. 1995; 18 pages.

Jones et al.; "A probabilistic model of information retrieval: development and comparative experiments: Part 2"; Information Processing & Management; vol. 36; 2000; p. 809-840.

Valizadegan et al.; "Learning to Rank by Optimizing NDCG Measure"; In Advances in Neural Information Processing Systems; 2009; p. 1883-1891.

"Security Pillar—AWS Well-Architected Framework"; Amazon Web Services Inc.; Jul. 2020; 46 pages.

Brier et al.; "Verification of Forecasts Expressed in Terms of Probability"; Monthly Weather Review; vol. 78 No. 1; Jan. 1950; 3 pages.

Burks et al.; "Data Augmentation with Generative Models for Improved Malware Detection: a Comparative Study"; IEEE $10^{th}$ Annual Ubiquitous Computing, Electronics Mobile Communication Conf.; 2019; 7 pages.

Joseph Carson; "The 6 Most Disturbing Data Breaches in 2018"; https://thycotic.com/company/blog/2018/0/31/the-6-most-disturbing-data-breaches-in-2018-so-far/; Thycotic; Jul. 2018; accessed Dec. 11, 2021; 10 pages.

Che et al.; "Mode Regularized Generative Adversarial Networks"; arXiv:1612.02136; 2017; 13 pages.

Chen et al.; "MXNet: A Flexible and Efficient Machine Learning Library for Heterogeneous Distributed Systems"; arXiv:1512.01274; 2015; 6 pages.

Gemp et al.; "Weakly semi-supervised neural topic models"; ICLR Limited Labelled Data Workshop; 2019; 8 pages.

Goodfellow et al.; "Generative Adversarial Nets"; In Advances in Neural Information Processing Systems; 2014; p. 2672-2680.

"Risky Business #486—Locking down AWS permissions with Repo Kid"; https://risky.biz/RB486/; Risky Business; Feb. 2018; accessed Dec. 11, 2021; 5 pages.

He et al.; "Deep Residual Learning for Image Recognition"; IEEE Conf. on Computer Vision and Pattern Recognition; 2016; p. 770-778.

Chan et al.; "Introducing Aardvark and Repokid"; https://netflixtechblog.com/introducing-aardvark-and-repokid-53b081bf3a7e; NetFlix; Jun. 2017; accessed Dec. 11, 2021; 7 pages.

Rezende et al. "Variational Inference with Normalizing Flows"; $32^{nd}$ Int'l Conf. on Machine Learning Research; 2015; p. 1530-1538.

Salimans et al.; "Improved Techniques for Training Gans"; In Advances in Neural Information Processing Systems; 2016; p. 2234-2242.

Snoek et al.; "Practical Bayesian Optimization of Machine Learning Algorithms"; In Adances in Neural Information Processing Systems; 2012; 12 pages.

Srivastava et al.; "Dropout: A Simple Way to Prevent Neural Networks from Overfitting"; Journal of Machine Learning Research; vol. 15; 2014; p. 1929-1958.

Sun et al.; "A Comparison Study of VAE and GAN for Software Fault Prediction"; Int'l Conf. on Algorithms and Architectures for Parallel Processing; Oct. 2020; p. 82-96.

Tolstikhin et al.; "Wasserstein Auto-Encoders"; arXiv1711.01558; 2019; 20 pages.

Turenko et al.; "Oversampling Versus Variational Autoencoders: Employing Synthetic Data for Detection of Heracleum Sosnowskyi in Satellite Images"; Information Science and Applications; May 2020; p. 399-409.

Wang et al.; "Safer Classification by Synthesis"; In NeurIPS Aligned AI Workshop; 2017; 12 pages.

Zhang et al.; "Over-Sampling Algorithm Based on VAE in Imbalanced Classification"; Int'l Conf. on Cloud Computing; 2018; p. 334-344.

(56) References Cited

OTHER PUBLICATIONS

Ribeiro et al.; ""Why Should I Trust You?" Explaining the Predictions of Any Classifier"; Proceedings of the 22$^{nd}$ ACM SIGKDD Int'l Conf on Knowledge Discovery and Data Mining; Aug. 2016; p. 1135-1144.
Ribeiro et al.; "Anchors: High-Precision Model-Agnostic Explanations";32$^{nd}$ AAAI Conf. on Artificial Intelligence; vol. 32; 2018; 9 pages.
Zhang et al.; "Interpreting Neural Network Judgments via Minimal, Stable, and Symbolic Corrections"; 32$^{nd}$ Conf on Neural Information Processing Systems; 2018; 12 pages.
Madry et al.; "Towards Deep Learning Models Resistant to Adversarial Attacks"; Machine Learning; arXiv:1706.06083; 2018; 28 pages.
Tamer et al.; "The Space of Transferable Adversarial Examples"; Machine Learning; arXiv:1704.03453; 2017; 15 pages.
Wang et al.; "Formal Security Analysis of Neural Networks using Symbolic Intervals"; 27$^{th}$ USENIX Security Symposium; 2018; 16 pages.
Guo et al.; "On Calibration of Modern Neural Networks"; Machine Learning; arXiv:1706.04599; 2017; 14 pages.
"Trie"; http://web.archive.org/web/20201121014636/https://en.wikipedia.org/wiki/ . . . ; Wikipedia; web archive from Nov. 21, 2020; accessed Jan. 25, 2022; 10 pages.
"DAWG documentation"; http://web.archive.org/web/20181220145725/https://dawg.readthedocs.io/en/lates . . . ; Wikipedia; web archive from Dec. 20, 2018, accessed Jan. 25, 2022; 14 pages.
"Okapi BM25"; http://web.archive.org/web/20201112014911/https://en.wikipedia.org/wiki/ . . . ; Wikipedia; web archive from Nov. 12, 2020; accessed Jan. 25, 2022; 4 pages.
"sklearn.calibration.CalibratedClassifierCV"; http://web.archive.org/web/20201112021039/https://scikit-learn.org/stable/modles/generated/sklearn.calibration.Calibra . . . ; scikit-learn developers; ©2007-2020; web archive from Nov. 12, 2020, accessed Jan. 25, 2022; 3 pages.
"Autoencoder"; http://web.archive.org/web/20201101012432/https://en.wikipedia.org/wiki/ . . . ; Wikipedia; web archive from Nov. 1, 2020; accessed Jan. 25, 2022; 15 pages.
"Reinforcement learning"; http://web.archive.org/web/20201106232717/https://en.wikipedia.org/wiki/ . . . ; Wikipedia; web archive from Nov. 6, 2020; accessed Jan. 25, 2022; 13 pages.
Lipton; "The Mythos of Model Interpretability"; ICML Workshop on Human Interpretability in Machine Learning; 2017; 9 pages.
"Why should we use Temperature in softmax?"; http://web.archive.org/web/20201101200714/https://stackoverflow.com/questions/58764619/why-should-we-use--temperature-in-softmax; web archive from Nov. 1, 2020; accessed Jul. 6, 2022; one page.
"Create a custom analyzer"; web.archive.org/web/20201013023944/https://www.elastic.co/guide/en/elasticsearch/reference/current/analysis-custom-analyzer.html; Elasticsearch; ©2020; web archive from Oct. 13, 2020; accessed Jul. 1, 2022; 4 pages.
"Multi-armed bandit"; web.archive.org/web/20201029112217/https://en.wikipedia.org/wiki/Multi-armed_bandit; Wikipedia; web archive from Oct. 29, 2020; accessed Jul. 6, 2022; 19 pages.
"Viewing last accessed information for IAM"; web.archive.org/web/20201028103721/https://docs.aws.amazon.com/IAM/latest/UserGuide/access_policies_access-advisor-view-data.html; Amazon Web Services, Inc.; ©2020; web archive from Oct. 28, 2020; accessed Jul. 6, 2022; 5 pages.
"Similarity module"; web.archive.org/20200928065912/https://www.elastic.co/guide/en/elasticsearch/reference/current/index-modules-similarity.html; Elasticsearch; ©2020; web archive from Sep. 28, 2020; accessed Jul. 1, 2022; 8 pages.
"Similarity mapping parameters"; web.archive.org/web/20201029031236/https://www.elastic.co/guide/en/elasticsearch/reference/current/similarity.html; Elasticsearch; ©2020; web archive from Oct. 29, 2020; accessed Jul. 6, 2022; 3 pages.
Wang et al.; "Exploring the machine learning models behind Cloud IAM Recommender"; https://cloud.google.com/blog/products/identity-security/exploring-the-machine-learning-modes-behind-cloud-iam-recommender; Google; Nov. 2019; accessed Sep. 12, 2022; 4 pages.
Hummer et al.; "Adaptive identity and access management—contextual data based policies"; EURASIP Journal on Information Security; vol. 2016:19; 2016; 16 pages.
Mitra et al.; "A Survey of Role Mining"; ACM Computing Surveys; vol. 48 No. 4; Feb. 2016; p. 50:1-50:37.
Kumar et al.; "Mining RBAC Roles under Cardinality Constraint"; Int'l Conf. on Information Systems Security; 2010; p. 171-185.

\* cited by examiner

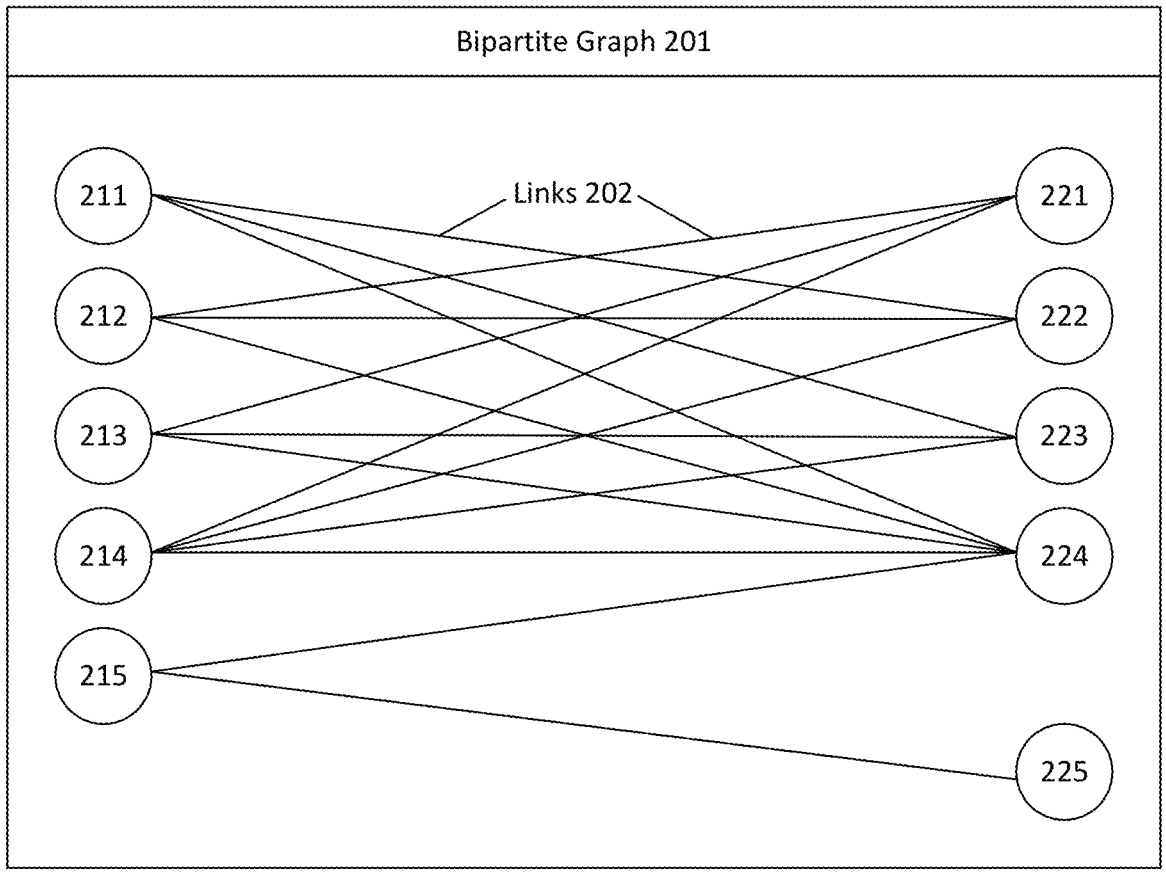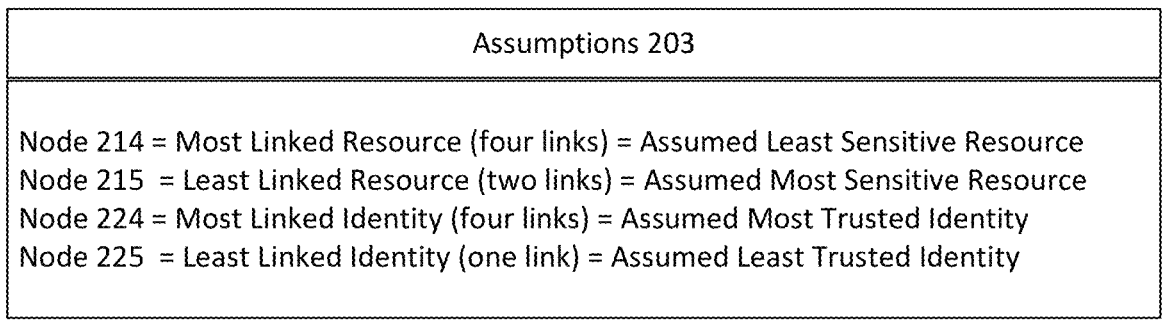
FIG. 2

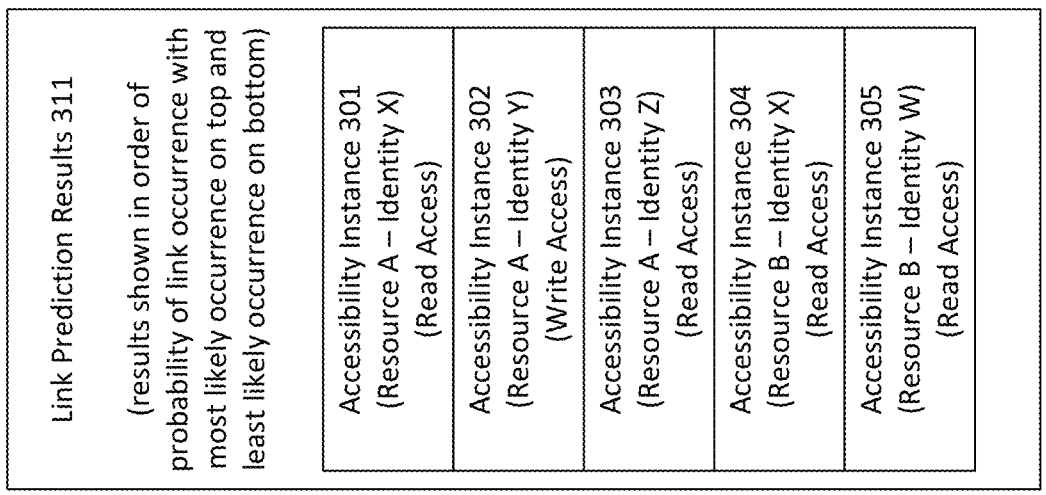
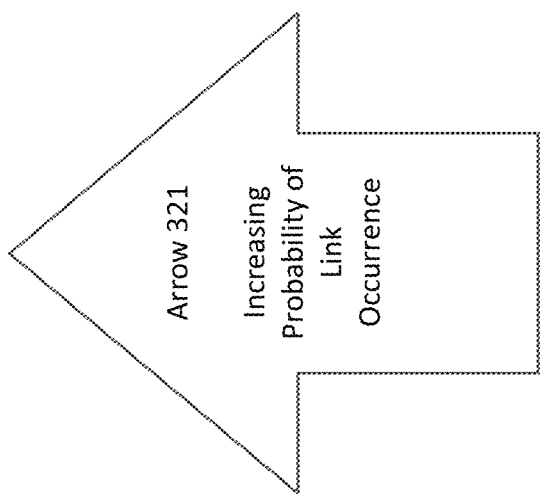
FIG. 3

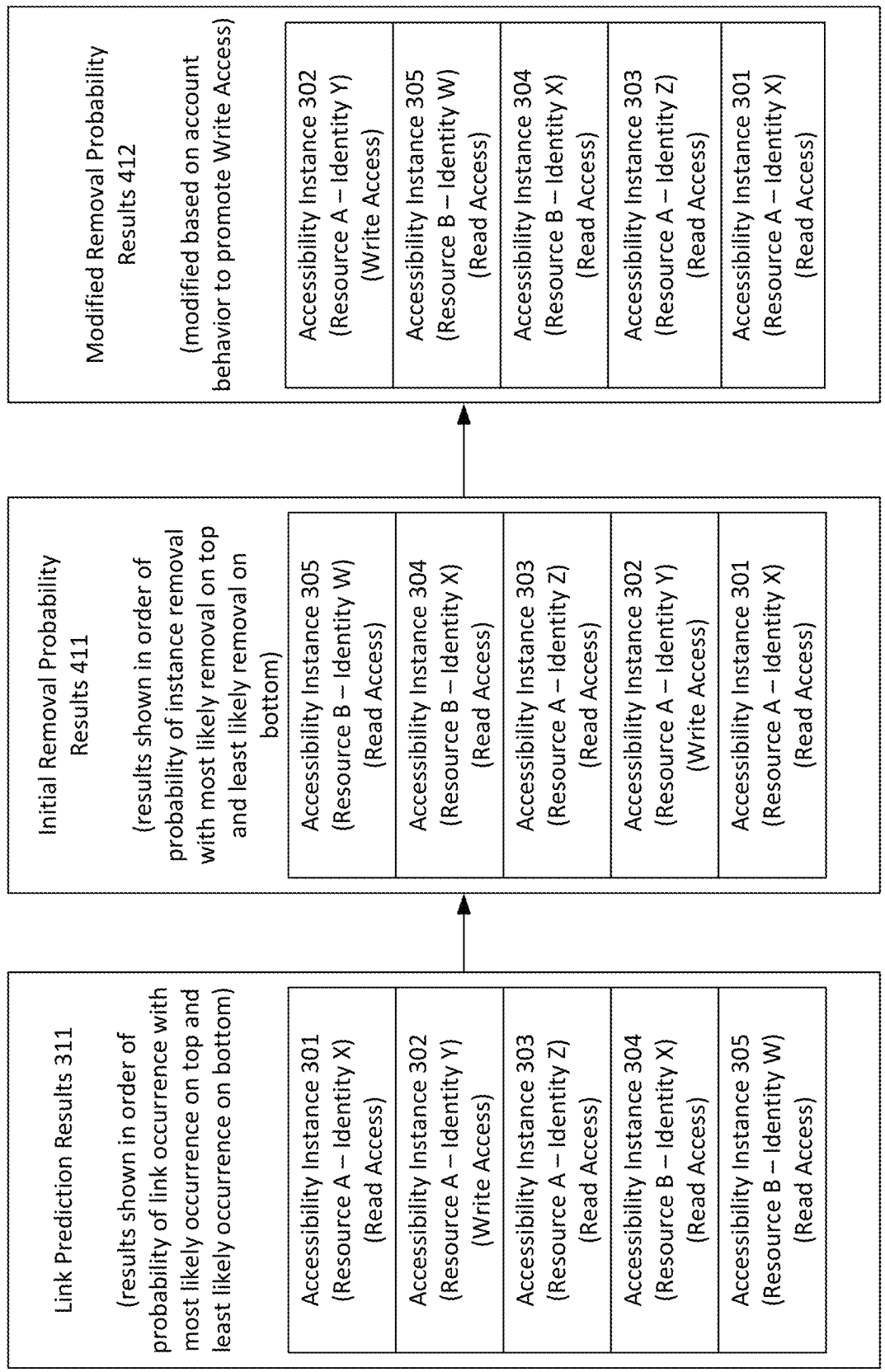

User Interface 110

We have identified the following instances in which your internal resources are accessible to external identities from another account. These findings are shown in order corresponding to their expected probability of removal, with the most likely removals listed first at the top of the list:

Prioritized Display 109

| Accessibility Instance 302 (Resource A – Identity Y) (Write Access) | Retain 505 | Remove 515 |
| Accessibility Instance 305 (Resource B – Identity W) (Read Access) | Retain 504 | Remove 514 |
| Accessibility Instance 304 (Resource B – Identity X) (Read Access) | Retain 503 | Remove 513 |
| Accessibility Instance 303 (Resource A – Identity Z) (Read Access) | Retain 502 | Remove 512 |
| Accessibility Instance 301 (Resource A – Identity X) (Read Access) | Retain 501 | Remove 511 |

↑

Modified Removal Probability Results 412

(modified based on account behavior to promote Write Access)

- Accessibility Instance 302 (Resource A – Identity Y) (Write Access)
- Accessibility Instance 305 (Resource B – Identity W) (Read Access)
- Accessibility Instance 304 (Resource B – Identity X) (Read Access)
- Accessibility Instance 303 (Resource A – Identity Z) (Read Access)
- Accessibility Instance 301 (Resource A – Identity X) (Read Access)

FIG. 5

610 Identify a plurality of cross account resource accessibility instances in which a plurality of resources are accessible by a plurality of identities that are external to an account that controls the plurality of resources

612 Determine, based at least in part on a link prediction analysis, a plurality of estimated occurrence probabilities of a plurality of links between the plurality of resources and the plurality of identities

614 Determine, based at least in part on the plurality of estimated occurrence probabilities, a plurality of estimated removal probabilities of the plurality of cross account resource accessibility instances

616 Generate, based at least in part on the plurality of estimated removal probabilities, a plurality of weights for the plurality of cross account resource accessibility instances

618 Provide, based at least in part on the plurality of weights, to a user of the account, a prioritized display of a plurality of indications of the plurality of cross account resource accessibility instances

REMOVAL PROBABILITY-BASED WEIGHTING FOR RESOURCE ACCESS

BACKGROUND

Various services may be provided that may allow customers to manage access to computing resources. For example, permissions for a resource may be managed by attaching, and removing, permissions to, and from, the resource. In some examples, certain permissions that are attached to a resource may allow cross account accessibility to the resource. Cross account accessibility is a scenario in which a resource, which is controlled by a first account, has an attached permission that allows access, to the resource, by an identity in an external account (i.e., an account that is different from the first account that controls the resource). Many instances of cross account resource accessibility are intentional and advantageous to customers. However, some instances of cross account accessibility may be unintentional and may pose potential security risks to the accounts that control those resources. In an attempt to reduce these security risks, some services may analyze a resource's permissions to identity instances of cross account accessibility to customers. However, in at least some cases, the results of this analysis may not be provided in a manner that is entirely helpful to customers.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 is a diagram illustrating an example bipartite graph and related assumptions that may be used in accordance with the present disclosure.

FIG. 3 is a diagram illustrating example link prediction results that may be used in accordance with the present disclosure.

FIG. 4 is a diagram illustrating an example relationship between link prediction results, removal probability results, and weighted accessibility instances that may be used in accordance with the present disclosure.

FIG. 5 is a diagram illustrating an example user interface including a prioritized display of accessibility instances that may be used in accordance with the present disclosure.

FIG. 6 is a flowchart illustrating an example removal probability-based weighting process that may be used in accordance with the present disclosure.

DETAILED DESCRIPTION

Figure 1:
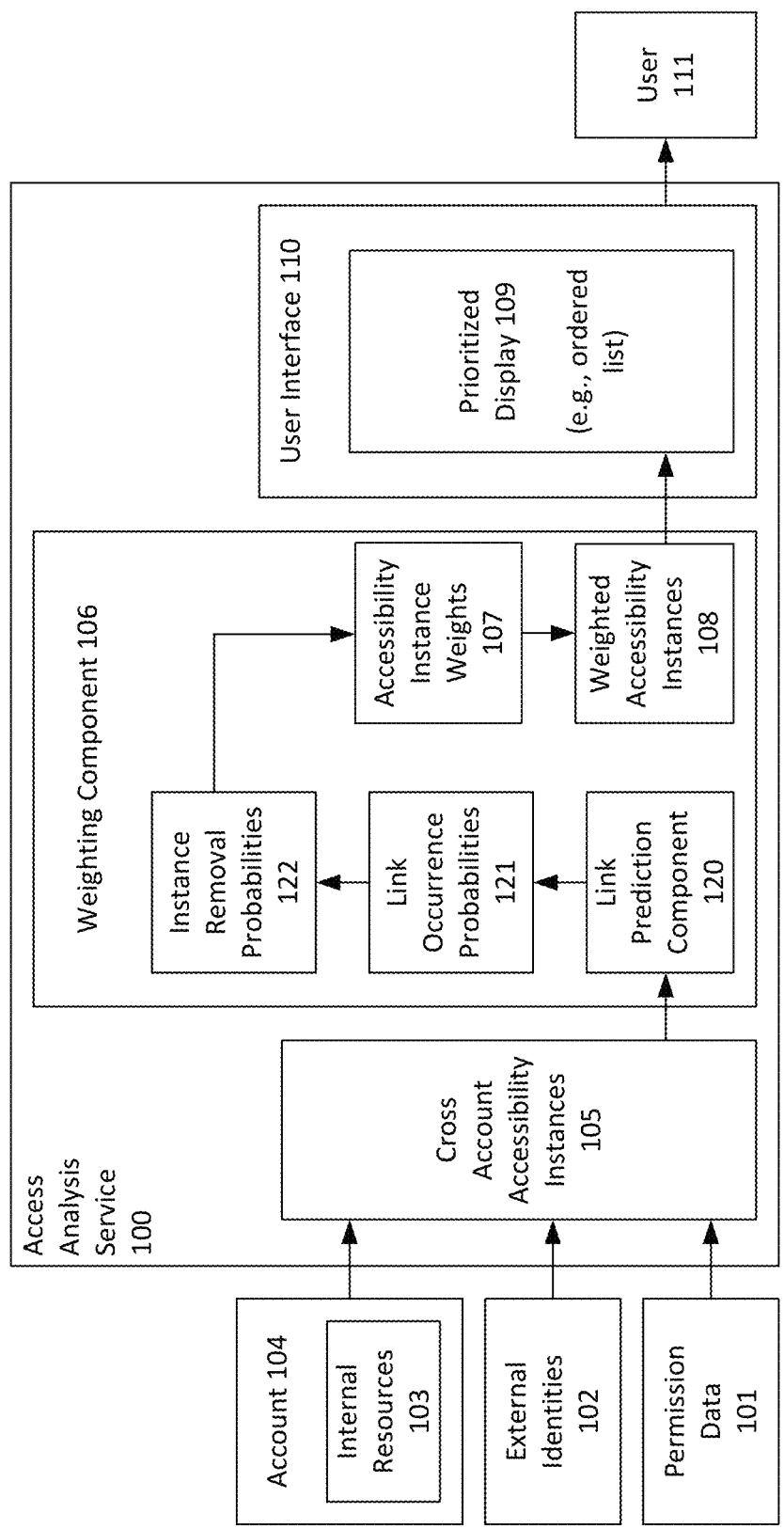
FIG. 1 is a diagram illustrating an example removal probability-based weighting system that may be used in accordance with the present disclosure.

Techniques for removal probability-based weighting for resource access are described herein. In some examples, an access analysis service may be provided that identifies instances of cross account resource accessibility to customers. As described above, cross account accessibility refers to a scenario in which a resource (e.g., a bucket, a key, a queue, a serverless function, etc.) belonging to a first account is accessible to an external identity, which is an identity (e.g., a role, a user group, etc.) belonging to an external account (i.e., an account that is different from the first account that controls the resource). The access analysis service may provide a user interface in which indications of the identified instances of cross account accessibility are displayed to a user, such as via a scrollable list. In some examples, the user interface may provide details regarding the identified instances of cross account accessibility, such as indications of the accessible resource, indications of the external identity to which the resource is accessible, indications of the type of access provided (e.g., read, write, etc.), and other related information. The user interface may also allow the user to take actions with respect to the identified instances of cross account accessibility, such as retaining (e.g., archiving) the accessibility, removing (e.g., resolving) the accessibility, and the like. In some examples, when a customer chooses to remove a cross account accessibility to a resource, the customer may be directed to another user interface display that allows the resource's permissions to be modified, such as by removing or modifying a permission that allows an external entity to access the resource.

In some examples, there may be a large quantity of identified instances of cross account accessibility to resources that are controlled by a given account. Thus, in some cases, a list of instances of cross account accessibility may be long. In at least some conventional access analysis systems, a list (or other indications) of cross account accessibility instances may not be organized in a manner that is entirely helpful to customers. In one specific example, a conventional access analysis system may provide a list of cross account accessibility instances that is organized based on update times at which the cross account accessibility instances were identified. For example, the most recent updates (corresponding to the most recently identified instances) may be located at the top of the list, while the least recent updates (corresponding to the least recently identified instances) may be located at the bottom of the list. This arrangement is not particularly helpful to users, for example because it does not indicate which instances of cross account access are most relevant to the user. Because a purpose of the list is to allow the user to identify (and eventually remove) unintended cross account accessibility instances, an accessibility instance may be considered relevant to the user if it is likely to be removed by the user, such that the most relevant accessibility instances are the most likely to be removed. When the list is arranged based on updates times, the user is given no indications of which accessibility instances are the most relevant (i.e., the most likely to be removed). In some examples, the user may be forced to review the entire list in order to find the most relevant results, and the user may often miss highly relevant results that are located at the bottom of the list. This may be inconvenient and inefficient for users and may lead to potential security risks.

In contrast to the above-described update time-based organization, the techniques described herein may allow cross account accessibility instances to be weighted based on an estimated removal probability, which is an estimated probability that a user will remove a respective accessibility instance. Identified cross account accessibility instances may then be presented in a prioritized display, such as an ordered list, that is organized based on the instance weights. For example, in some cases, cross account accessibility instances that have a highest probability of removal by a user may be assigned a highest weight and may, therefore, be placed at the top of the ordered list. By contrast, cross account accessibility instances that have a lowest probability of removal by a user may be assigned a lowest weight and may, therefore, be placed at the bottom of the ordered list. In this manner, the access analysis service may indicate to users which accessibility instances are estimated to be the most relevant (i.e., the most likely to be removed by the user). This may allow the user to prioritize his or her review of highly relevant accessibility instances, such as by reviewing the highly relevant accessibility instances first. When a user has limited time, the user may be unable to review all accessibility instances, and this prioritization may help ensure that the user is able to review the most relevant accessibility instances. This may help to improve efficiency and reduce security risks.

In some examples, in order to determine the estimated probabilities of removal, the access analysis service may perform a link prediction analysis on the identified cross account accessibility instances. A link prediction analysis, as that term is used herein, refers to analysis that predicts estimated occurrences of a plurality of links. In this example, the links may represent cross account accessibility instances. Thus, each link may represent a respective instance in which an external identity has access to an internal resource. The link prediction analysis may be employed to determine a respective estimated occurrence probability of each link. It is noted that link prediction techniques may often be employed in order to determine a probability of a link, which has not yet occurred, being formed in the future. For example, in some existing social media contexts, link prediction may be employed to determine a probability of a future link between two users, such as to suggest that the two users should become friends with one another. In contrast to techniques in which link prediction is used to find the probabilities of links occurring in the future, the techniques described herein may employ link prediction to estimate the probabilities of occurrence of links that have already been formed. This is because, in this case, the links represent instances in which a resource is already accessible to users, and link prediction is being used to help indicate which existing links are the most likely to be removed by users.

In some examples, the link prediction analysis may include a bipartite data analysis that is performed on two groups of entities, in which a first group is the internal resources that are accessible to external identities and a second group is the external identities that have access to the internal resources. Specifically, for each of the internal resources that are accessible to one or more external identities, the bipartite analysis may include determining to which, and to how many, external identities the internal resource is linked (i.e., is accessible). Additionally, for each of the external identities that have access to one or more internal resources, the bipartite analysis may include determining to which, and to how many, internal resources the external identity is linked (i.e., has access). In some examples, in order to make these determinations, the access analysis service may generate data that is representative of a bipartite graph of links between internal resources and external identities.

The above described link determinations may be employed to assist in predicting the estimated occurrence probabilities of each the links. For example, in some cases, an estimated occurrence probability of a given link between a given internal resource and a given external identity may be determined based at least in part a quantity of external identities to which the given internal resource is linked and a quantity internal resources to which the given external identity is linked. In some examples, an extent to which an external identity is assumed to be trusted may be based at least in part on a quantity of internal resources to which the external resource is linked. Specifically, if an external identity is linked to a large quantity of internal resources, then this may suggest that the external identity may be highly trusted. By contrast, if an external identity is linked to only a single internal resource (or other small quantity of internal resources), then this may suggest that the external identity may not be highly trusted. Additionally, in some examples, an extent to which an internal resource is assumed to be a security-sensitive resource may be based at least in part on a quantity of internal resources to which the external resource is linked. Specifically, if an internal resource is linked to a large quantity of external identities, then this may suggest that the internal resource may not include sensitive data. By contrast, if an internal resource is linked to only a single external identity (or other small quantity of external identities), then this may suggest that the internal resource may include at least some sensitive data. Thus, in some examples, links between highly linked external identities and highly linked internal resources may be determined to have high estimated occurrence probabilities, as these links may suggest connections between a highly trusted external identity and a less sensitive resource. By contrast, in some examples, links between non-highly linked external identities and non-highly linked internal resources may be determined to have low estimated occurrence probabilities, as these links may suggest connections between a less trusted external identity and a more sensitive resource.

Thus, link prediction techniques may be employed to determine estimated occurrence probabilities of links between internal resources and external identities. These estimated occurrence probabilities may then be used to assist in determining estimated removal probabilities for instances of cross account access. It is noted however, that the estimated occurrence probabilities may be inversely related to the estimated removal probabilities. For example, if a link between a given internal resource and a given external identity is determined to have a low probability of occurrence, then it may also be likely that the instance of cross account accessibility represented by the link is unintentional and, therefore, has a high probability of removal. By contrast, if a link between a given internal resource and a given external identity is determined to have a high probability of occurrence, then it may also be likely that the instance of cross account accessibility represented by the link is intentional and, therefore, has a low probability of removal. Thus, in some examples, the estimated removal probabilities may be determined based, at least in part, on an inverse of the estimated occurrence probabilities.

FIG. 1 is a diagram illustrating an example removal probability-based weighting system that may be used in accordance with the present disclosure. As shown in FIG. 1, access analysis service 100 may identify cross account accessibility instances 105 related to account 104. The account 104 has a number of internal resources 103 that belong to (i.e., that are controlled by) the account 104. The internal resources 103 may include resources such as buckets, keys, queues, serverless functions, and the like. As shown in FIG. 1, there are a number of external identities 102 that are external to account 104, meaning that the external identities do not belong to (i.e., are not controlled by) account 104. Thus, the external identities 102 may belong to one or more other accounts (not shown) that differ from account 104. The external identities 102 may include identities such as roles, user groups, and the like. The cross account accessibility instances 105 are instances in which one of the internal resources 103 are accessible to one of the external identities 102. In some examples, a single one of the internal resources 103 may be accessible to multiple ones of the external identities 102, thereby resulting in multiple respective instances of cross account accessibility instances 105. Similarly, in some examples, a single one of the external identities 102 may have access to multiple ones of the internal resources 103, thereby resulting in multiple respective instances of cross account accessibility instances 105. The access analysis service 100 may identify the cross account accessibility instances 105 based on permissions data 101, which may indicate permissions that are assigned to the external identities 102 and/or the internal resources 103 as well as optionally other resources and identities. It is noted that there is no requirement that external identities 102 (or any other identities referred to herein) must be authenticated. Thus, the term identity, as used herein, may encompass an authenticated identity or a non-authenticated identity. For example, in some cases, an identity may include an access from a specified network, an access from a specified Internet Protocol (IP) or other address, and/or an access having other specified access parameters, regardless of whether or not the agent performing this access is authenticated.

The access analysis service 100 may provide a user interface 110 in which indications of the cross account accessibility instances 105 are displayed to a user 111 via a prioritized display 109, such as an ordered list. In some examples, prioritized display 109 may be scrollable, for example depending on a quantity of cross account accessibility instances 105 that are included in the prioritized display 109. In some examples, the user interface 110 may provide details regarding the cross account accessibility instances 105, such as indications of the accessible resource, indications of the external identity to which the resource is accessible, indications of the type of access provided (e.g., read, write, etc.), and other related information. The user interface 110 may also allow the user 111 to take actions with respect to the cross account accessibility instances 105, such as retaining (e.g., archiving) the accessibility, removing (e.g., resolving) the accessibility, and the like. In some examples, when a customer chooses to remove a cross account accessibility to a resource, the customer may be directed to another user interface display that allows the resource's permissions to be modified, such as by removing or modifying a permission that allows an external entity to access the resource.

The techniques described herein may allow the cross account accessibility instances 105 to be weighted based on instance removal probabilities 122, which are estimated probabilities that a user 111 will remove respective ones of the cross account accessibility instances 105. Specifically, a weighting component 106 may calculate accessibility instance weights 107 based on the instance removal probabilities 122. The cross account accessibility instances 105 may then be presented in prioritized display 109, such as an ordered list, based on the accessibility instance weights 107. For example, in some cases, one or more of the cross account accessibility instances 105 that have a highest probability of removal by a user 111 may be assigned a highest weight and may, therefore, be placed at the top of the ordered list. By contrast, one or more other of the cross account accessibility instances 105 that have a lowest probability of removal by a user 111 may be assigned a lowest weight and may, therefore, be placed at the bottom of the ordered list. In this manner, the access analysis service 100 may indicate to user 111 which ones of the cross account accessibility instances 105 are estimated to be the most relevant (i.e., the most likely to be removed by the user 111). This may allow the user 111 to prioritize his or her review of highly relevant accessibility instances, such as by reviewing the highly relevant accessibility instances first. When a user has limited time, the user may be unable to review all accessibility instances, and this prioritization may help ensure that the user is able to review the most relevant accessibility instances. This may help to improve efficiency and reduce security risks.

As shown in FIG. 1, weighting component 106 includes link prediction component 120, which may perform a link prediction analysis on the cross account accessibility instances 105. In this link prediction analysis, the links may represent the cross account accessibility instances 105. Thus, each link may represent a respective instance in which one of the external identities 102 has access to one of the internal resources 103. The link prediction analysis may be employed to determine a respective estimated occurrence probability of each link. Each of the calculated estimated occurrence probabilities are included in link occurrence probabilities 121. It is noted that link prediction techniques may often be employed in order to determine a probability of a link, which has not yet occurred, being formed in the future. For example, in some existing social media contexts, link prediction may be employed to determine a probability of a future link between two users, such as two suggest that the two users should become friends with one another. In contrast to techniques in which link prediction is used to find the probabilities of links occurring in the future, the techniques described herein may employ link prediction to estimate the probabilities of occurrence of links that have already been formed. This is because, in this case, the links represent instances in which a resource is already accessible to users, and link prediction is being used to help indicate which existing links are the most likely to be removed by users.

The link prediction component 120 may perform a bipartite data analysis on two groups of entities, in which a first group is each of internal resources 103 that are accessible to one or more of the external identities 102 and a second group is each of the external identities 102 that have access to one or more of the internal resources 103. Specifically, for each of the internal resources 103 that are accessible to one or more of the external identities 102, the bipartite analysis may include determining to which, and to how many, ones of the external identities 102 the internal resource is linked (i.e., is accessible). Additionally, for each of the external identities 102 that have access to one or more of the internal resources 103, the bipartite analysis may include determining to which, and to how many, ones of the internal resources 103 the external identity is linked (i.e., has access). In some examples, in order to make these determinations, the link prediction component 120 may generate data that is representative of a bipartite graph of links between internal resources 103 and external identities 102.

Referring now to FIG. 2, a bipartite graph 201 is shown. In the example of FIG. 2, nodes 211-215 represent resources of the internal resources 103 that are accessible to one of more of the external identities 102. Additionally, nodes 221-224 represent identities of the external identities 102 that have access to one of more of the internal resources 103. Links 202 represent each instance of the cross account accessibility instances 105. Thus, each of links 202 represents a respective instance in which one of the internal resources 103 is accessible to one of the external identities 102. It is noted that there is no requirement that link prediction component 120 must generate an actual graph. Rather, the link prediction component 120 may instead generate underlying data that is representative of the bipartite graph, such as by determining a respective internal resource and a respective external identity corresponding to each of links 202, as well as other information, such as a respective type of access (e.g., read, write, etc.).

The above described link determinations may be employed to assist in predicting the estimated occurrence probabilities of the links 202. For example, in some cases, an estimated occurrence probability of a given link between a given internal resource and a given external identity may be determined based at least in part on a quantity of external identities to which the given internal resource is linked and a quantity internal resources to which the given external identity is linked. In some examples, an extent to which an external identity is assumed to be trusted may be based at least in part on a quantity of internal resources to which the external resource is linked. Specifically, if an external identity is linked to a large quantity of internal resources, then this may suggest that the external identity may be highly trusted. By contrast, if an external identity is linked to only a single internal resource (or other small quantity of internal resources), then this may suggest that the external identity may not be highly trusted. Additionally, in some examples, an extent to which an internal resource is assumed to be a security-sensitive resource may be based at least in part on a quantity of internal resources to which the external resource is linked. Specifically, if an internal resource is linked to a large quantity of external identities, then this may suggest that the internal resource may not include sensitive data. By contrast, if an internal resource is linked to only a single external identity (or other small quantity of external identities), then this may suggest that the internal resource may include at least some sensitive data.

As also shown in FIG. 2, assumptions 203 may be made by link prediction component 120 based on the information represented in bipartite graph 201. For example, as shown in assumptions 203, node 214 represents the most linked resource because it has four links, which is more than any of the other resource nodes (i.e., more than any of nodes 211-213 and more than node 215). Thus, based on this information, it may be assumed that node 214 represents the least sensitive resource. As also shown in assumptions 203, node 215 represents the least linked resource because it has only two links, which is fewer than any of the other resource nodes (i.e., fewer than any of nodes 211-214). Thus, based on this information, it may be assumed that node 214 represents the most sensitive resource. As also shown in assumptions 203, node 224 represents the most linked identity because it has four links, which is more than any of the other identity nodes (i.e., more than any of nodes 221-223 and more than node 225). Thus, based on this information, it may be assumed that node 214 represents the most trusted identity. As also shown in assumptions 203, node 225 represents the least linked identity because it has only one link, which is fewer than any of the other identity nodes (i.e., fewer than any of nodes 221-224). Thus, based on this information, it may be assumed that node 214 represents the least trusted identity. Thus, in some examples, the link between node 224 (representing the highest linked identity) and node 214 (representing the highest linked resource) may be determined to have a high estimated occurrence probability, as this link may suggest connection between a highly trusted external identity and a less sensitive internal resource. By contrast, in some examples, the link between node 225 (representing the least linked identity) and node 214 (representing the least linked resource) may be determined to have a low estimated occurrence probability, as this link may suggest connection between a non-highly trusted external identity and a more sensitive internal resource.

It is noted that, in addition or as an alternative to examining quantities of links, other factors may also be employed to determine link occurrence probabilities 121 and/or instance removal probabilities 122. For example, in some cases, weighting component 106 may examine characteristics of internal resources and external identities that are not linked (i.e., instances where a given internal resource is not accessible to a given external identity). These may optionally include both instances in which the given internal resource was never accessible to the given external identity and instances in which the given internal resource was formerly accessible to the given external identity (but the access has since been removed). Specifically, in some examples, weighting component 106 may examine these non-linked instances to determine characteristics of the given internal resource, the given external identity, and the access between them (e.g., for instances in which the access had formerly existed but has since been removed). These characteristics may be referred to as negative characteristics, as they correspond to instances where there is no link. The weighting component 106 may then attempt match these negative characteristics to characteristics associated with each of the links 202. If the characteristics of a given link strongly match many of the negative characteristics, then this may indicate a lower probability of link occurrence. By contrast, if the characteristics of a given link do not match many of the negative characteristics, then this may indicate a higher probability of link occurrence. Thus, in some examples, link occurrence probabilities 121 and/or instance removal probabilities 122 may be determined based at least in part on negative characteristics of instances where no link exists. In some examples, negative characteristics of instances in which the given internal resource was formerly accessible, but has since been removed, may be given stronger consideration than negative characteristics of instances in which no link has ever existed.

In some examples, a variety of negative characteristics may be analyzed to assist in making the comparisons described above. For example, for a resource, the negative characteristics may include a type of the resource (e.g., buckets, keys, queues, serverless functions, etc.), a type of service to which the resource corresponds, an age of the resource, any tags that may be assigned to the resource, and other characteristics. For an identity, the negative characteristics may include a type of the identity (e.g., role, user group, user, federated user, etc.), an age of the identity, any tags that may be assigned to the identity, and other characteristics. Additionally, negative access characteristics may include a type of access (e.g., read, write, etc.), a duration of the access, and other characteristics.

Referring now to FIG. 3, some example results of a link prediction analysis will now be described in detail. In this example, link prediction results 311 include five accessibility instances 301-305 that have been analyzed by link prediction component 120 to determine their respective estimated link occurrence probabilities. As shown in FIG. 3, arrow 321 indicates that, for this example, the probability of link occurrence for link prediction results 311 increases from bottom to top, with the most likely link occurrence being on top. In this example, accessibility instance 301 was estimated to have its link be the most likely to occur. Thus, in this example, accessibility instance 301 is listed at the top of link prediction results 311. Accessibility instance 302 was estimated to have its link be the second-most likely to occur. Thus, in this example, accessibility instance 302 is listed second from the top of link prediction results 311. Accessibility instance 303 was estimated to have its link be the third-most likely to occur. Thus, in this example, accessibility instance 303 is listed third from the top of link prediction results 311. Accessibility instance 304 was estimated to have its link be the fourth-most likely to occur. Thus, in this example, accessibility instance 304 is listed fourth from the top of link prediction results 311. Accessibility instance 305 was estimated to have its link be the least likely of the five links to occur. Thus, in this example, accessibility instance 305 is listed at the bottom of link prediction results 311. In some examples, link prediction component 120 may generate estimated percentages (or ranges of percentages) indicating a probability that a respective link will occur for each of the accessibility instances 301-305. In other examples, link prediction probabilities may be calculated and expressed in other ways, such as using ratios, and other relative values (e.g., high, medium, low, etc.). In yet other examples, the link prediction probabilities may be calculated and expressed as a relative ranking which merely ranks the links in relative order of the link occurrence probabilities, without necessarily calculating respective percentages, ratios or other amounts.

As described above, the estimated occurrence probabilities may be inversely related to the estimated removal probabilities. For example, if a link between a given internal resource and a given external identity is determined to have a low probability of occurrence, then it may also be likely that the instance of cross account accessibility represented by the link is unintentional and, therefore, has a high probability of removal. By contrast, if a link between a given internal resource and a given external identity is determined to have a high probability of occurrence, then it may also be likely that the instance of cross account accessibility represented by the link is intentional and, therefore, has a low probability of removal. Thus, in some examples, the estimated removal probabilities may be determined based, at least in part, on an inverse of the estimated occurrence probabilities. As also shown in FIG. 3, arrow 322 indicates that, for this example, the probability of accessibility removal of the link prediction results 311 increases from top to bottom. As shown, arrow 322 points downward, while arrow 321 points upward, thereby indicating the inverse relationship between estimated link occurrence probabilities and estimated accessibility removal probabilities.

Referring now to FIG. 4, link prediction results 311 are shown on the left side of FIG. 4. Additionally, initial removal probability results 411 are also shown in the middle of FIG. 4. The initial removal probability results 411 indicate the relative order of estimated removal probabilities of the accessibility instances 301-305, with the highest removal probability on top and the lowest removal probability on bottom. In this example, due to the inverse relationship between estimated link occurrence probabilities and estimated accessibility removal probabilities, the order of the accessibility instances 301-305 shown in initial removal probability results 411 is flipped (i.e., reversed) in relation to the order of the accessibility instances 301-305 shown in link prediction results 311. Specifically, in this example, accessibility instance 305 is determined, based at least in part on having the lowest probability of link occurrence (as shown in link prediction results 311), to have the highest probability of removal. Thus, accessibility instance 305 is listed at the top of initial removal probability results 411. Also, accessibility instance 304 is determined, based at least in part on having the second-lowest probability of link occurrence (as shown in link prediction results 311), to have the second-highest probability of removal. Thus, accessibility instance 304 is listed second from the top of initial removal probability results 411. Also, accessibility instance 303 is determined, based at least in part on having the third-lowest probability of link occurrence (as shown in link prediction results 311), to have the third-highest probability of removal. Thus, accessibility instance 303 is listed third from the top of initial removal probability results 411. Also, accessibility instance 302 is determined, based at least in part on having the fourth-lowest probability of link occurrence (as shown in link prediction results 311), to have the fourth-highest probability of removal. Thus, accessibility instance 302 is listed fourth from the top of initial removal probability results 411. Also, accessibility instance 301 is determined, based at least in part on having the highest probability of link occurrence (as shown in link prediction results 311), to have the lowest probability of removal. Thus, accessibility instance 305 is listed at the bottom of initial removal probability results 411. In some examples, estimated percentages (or ranges of percentages) may be generated indicating a probability of removal for each of the accessibility instances 301-305. In other examples, accessibility instance removal probabilities may be calculated and expressed in other ways, such as using ratios, and other relative values (e.g., high, medium, low, etc.). In yet other examples, the accessibility instance removal probabilities may be calculated and expressed as a relative ranking which merely ranks the accessibility instances 301-305 in relative order of the accessibility instance removal probabilities, without necessarily calculating respective percentages, ratios or other amounts.

In some examples, the link prediction results 311 and the initial removal probability results 411 may be based on quantities of links associated with external identities and internal resources, such as described above with reference to FIG. 2. As also described above, in some examples, weighting component 106 may examine characteristics of resources and identities that are not linked (i.e., instances where a given internal resource is not accessible to a given external identity). These may optionally include both instances in which the given internal resource was never accessible to the given external identity and instances in which the given internal resource was formerly accessible to the given external identity (but the access has since been removed). Specifically, in some examples, weighting component 106 may examine these non-linked instances to determine characteristics of the given internal resource, the given external identity, and the access between them (e.g., for instances in which the access had formerly existed but has since been removed). These characteristics may be referred to as negative characteristics, as they correspond to instances where there is no link.

In FIG. 4, an example is shown in which the initial removal probability results 411 are modified based on negative characteristics to form modified removal probability results 412. Specifically, in this example, it may be determined that the account has recently removed access for a large quantity of cross account accessibility instances in which an external identity had write access to an internal resource. Based on this behavior, the weighting component 106 may determine that the account may not intend to allow external identities to have write access to its internal resources. Thus, the weighting component 106 may determine that cross account accessibility instances with write access may have a higher removal probability than cross account accessibility instances with other types of access (e.g., read access). In view of this, the weighting component 106 may choose to promote instances with write access in the modified removal probability results 412. As shown, in the example of FIG. 4, there is only a single accessibility instance with write access (i.e., accessibility instance 302). The other accessibility instances (i.e., accessibility instances 301 and 302-305) all have read access. Thus, in this example, accessibility instance 402 is promoted to the top of modified removal probability results 412, thereby indicating that accessibility instance 402 is now considered as the most likely to be removed. The remaining accessibility instances (i.e., accessibility instances 301 and 302-305) are then ranked in the same order as in initial removal probability results 411 (with the exception that accessibility instance 302 is moved to the top of the list). Accessibility instance 301 remains at the bottom of modified removal probability results 412, thereby indicating that it is still considered to be the least likely to be removed.

Referring back to FIG. 1, it is seen that accessibility instance weights 107 may be generated based at least in part on the instance removal probabilities 122. The accessibility instance weights may then be used to generate weighted accessibility instances 108, which are weighted based on the accessibility instance weights 107. In this example, because the accessibility instances weights 107 are generated based at least in part on the instance removal probabilities 122, the order of accessibility instances 301-305 in weighted accessibility instances 108 may be identical to the order of accessibility instances 301-305 in modified removal probability results 412. Specifically, accessibility instance 302 may have the highest weight. Accessibility instance 305 may have the second highest weight. Accessibility instance 304 may have the third highest weight. Accessibility instance 303 may have the fourth highest weight. Accessibility instance 301 may have the lowest weight. In some examples, estimated percentages (or ranges of percentages) may be generated indicating the accessibility instance weights 107 of the accessibility instances 301-305. In other examples, accessibility instance weights 107 may be calculated and expressed in other ways, such as using ratios, and other relative values (e.g., high, medium, low, etc.). In yet other examples, the accessibility instance weights 107 may be calculated and expressed as a relative ranking which merely ranks the accessibility instances 301-305 in relative order, without necessarily calculating respective percentages, ratios or other amounts.

Referring now to FIG. 5, some example contents of user interface 110 will now be described in detail. As shown in FIG. 5, user interface 110 includes a prioritized display 109, in which the accessibility instances are listed in order based on their relative weights. Accordingly, in the example of FIG. 5, the order in which accessibility instances 301-305 are listed in prioritized display 109 is identical to the order of accessibility instances 301-305 in the weighted accessibility instances 108 (which, in this example, is based on the order of modified removal probability results 412 as described above). For example, accessibility instance 301 has the highest probability of being removed by the user. For this reason, accessibility instance 301 is listed at the top of the prioritized display 109, which is often the first area of the prioritized display that is seen by the user. This helps to ensure that the user will review accessibility instance 301 first, which may be advantageous, for example if the user has limited time and cannot review all listed results. In some examples, prioritized display 109 may include a scrollable table, for example with a plurality of rows and columns, such as with each row corresponding to a respective one or accessibility instances 301-305. Additionally, in this example, prioritized display 109 includes retain buttons 501-505 and remove buttons 511-515. Each retain button 501-505 and remove button 511-515 corresponds to a respective one of the accessibility instances 301-305 that are shown in horizontal alignment. For example, retain button 505 and remove button 515 correspond to accessibility instance 305, which is horizontally aligned with retain button 505 and remove button 515.

In this example, each retain button 501-505 may be clicked by a user to indicate that the user wishes to retain a respective corresponding accessibility instance 301-305. For example, retain button 501 may be clicked by a user to indicate that the user wishes to retain the respective corresponding accessibility instance 301. In some examples, once a user clicks a corresponding retain button 501-505 the respective corresponding accessibility instance 301-305 may be removed from the prioritized display 109 (as the user has indicated that it is to be retained). By contrast, each remove button 511-515 may be clicked by a user to indicate that the user wishes to remove a respective corresponding accessibility instance 301-305. For example, remove button 515 may be clicked by a user to indicate that the user wishes to remove the respective corresponding accessibility instance 305. If the user clicks the remove button 515, the user interface 110 may add, or otherwise navigate to, an additional display (not shown) that allows the user to remove or otherwise modify the corresponding permission that allowed accessibility instance 305 to occur. Specifically, accessibility instance 305 allows Resource B to have read access to Identity W. When the user clicks remove button 515, a display may be shown that allows the user to remove the corresponding permission that allows Resource B to have read access to Identity W, such as by removing from Resource B, or by modifying with respect to Resource B, an existing policy that provided this permission.

FIG. 6 is a flowchart illustrating an example removal probability-based weighting process that may be used in accordance with the present disclosure. The process of FIG. 6 is initiated at operation 610, at which a plurality of cross account resource accessibility instances are identified in which a plurality of resources are accessible by a plurality of identities that are external to an account that controls the plurality of resources. For example, as shown in FIG. 1, access analysis service 100 may identify cross account accessibility instances 105, which are instances in which internal resources 103, which are controlled by account 104, are accessible to external identities 102, which are external to account 104. Each instance of cross account accessibility instances 105 represents a scenario in which one of the internal resources 103 is accessible to one of the external identities 102. As described above, the access analysis service 100 may identify the cross account accessibility instances 105 based on permissions data 101, which may indicate permissions that are assigned to the external identities 102 and/or the internal resources 103 as well as optionally other resources and identities.

At operation 612, a plurality of estimated occurrence probabilities of a plurality of links between the plurality of resources and the plurality of identities are determined based at least in part on a link prediction analysis. In this example, the links may represent the cross account accessibility instances. Thus, each link may represent a respective instance in which an external identity has access to an internal resource. The link prediction analysis may be employed to determine a respective estimated occurrence probability of each link. In some examples, the link prediction analysis may include a bipartite data analysis that is performed on two groups of entities, in which a first group is the internal resources that are accessible to external identities and a second group is the external identities that have access to the internal resources. Specifically, for each of the internal resources that are accessible to one or more external identities, the bipartite analysis may include determining to which, and to how many, external identities the internal resource is linked (i.e., is accessible). Additionally, for each of the external identities that have access to one or more internal resources, the bipartite analysis may include determining to which, and to how many, internal resources the external identity is linked (i.e., has access). In some examples, in order to make these determinations, the access analysis service may generate data that is representative of a bipartite graph of links between internal resources and external identities.

The above described link determinations may be employed to assist in predicting the estimated occurrence probabilities of each the links. For example, in some cases, an estimated occurrence probability of a given link between a given internal resource and a given external identity may be determined based at least in part a quantity of external identities to which the given internal resource is linked and a quantity internal resources to which the given external identity is linked. For example, a first estimated occurrence probability of the plurality of estimated occurrence probabilities may correspond to a first link of the plurality of links between a first identity of the plurality of identities and a first resource of the plurality of resources. Also, the first estimated occurrence probability may be determined based at least in part on a first quantity of resources to which the first identity is linked and a second quantity of identities to which the first resource is linked.

In some examples, an extent to which an external identity is assumed to be trusted may be based at least in part on a quantity of internal resources to which the external resource is linked. Specifically, if an external identity is linked to a large quantity of internal resources, then this may suggest that the external identity may be highly trusted. By contrast, if an external identity is linked to only a single internal resource (or other small quantity of internal resources), then this may suggest that the external identity may not be highly trusted. Additionally, in some examples, an extent to which an internal resource is assumed to be a security-sensitive resource may be based at least in part on a quantity of internal resources to which the external resource is linked. Specifically, if an internal resource is linked to a large quantity of external identities, then this may suggest that the internal resource may not include sensitive data. By contrast, if an internal resource is linked to only a single external identity (or other small quantity of external identities), then this may suggest that the internal resource may include at least some sensitive data. Thus, in some examples, links between a highly linked external identities and a highly linked internal resources may be determined to have high estimated occurrence probabilities, as these links may suggest connections between a highly trusted external identity and a less sensitive resource. By contrast, in some examples, links between non-highly linked external identities and non-highly linked internal resources may be determined to have low estimated occurrence probabilities, as these links may suggest connections between a less trusted external identity and a more sensitive resource.

At operation 614, a plurality of estimated removal probabilities of the plurality of cross account resource accessibility instances are determined based at least in part on the plurality of estimated occurrence probabilities. As described above, the estimated occurrence probabilities may be inversely related to the estimated removal probabilities. For example, if a link between a given internal resource and a given external identity is determined to have a low probability of occurrence, then it may also be likely that the instance of cross account accessibility represented by the link is unintentional and, therefore, has a high probability of removal. By contrast, if a link between a given internal resource and a given external identity is determined to have a high probability of occurrence, then it may also be likely that the instance of cross account accessibility represented by the link is intentional and, therefore, has a low probability of removal. Thus, in some examples, the estimated removal probabilities may be determined based, at least in part, on an inverse function of the estimated occurrence probabilities. In some examples, the plurality of estimated removal probabilities may also be determined based on characteristics of identities and resources that are not linked, which may be referred as negative characteristics. In some examples, initial estimated removal probabilities may be determined based on link prediction, such as based on quantities of links associated with linked resources and linked identities. The initial estimated removal probabilities may then be modified based on characteristics of identities and resources that are not linked, such as characteristics of access instances that have been recently removed by the account (or are otherwise not linked).

At operation 616, a plurality of weights for the plurality of cross account resource accessibility instances are generated based at least in part on the plurality of estimated removal probabilities. In some examples, the plurality of weights may include a ranked order of the plurality of cross account resource accessibility instances that is generated based on the plurality of estimated removal probabilities. For example, in some cases, the accessibility instance with the highest estimated removal probability may be assigned the highest rank. Each successive following rank may then be assigned to a remaining unranked accessibility instance with the highest estimated removal probability. For example, in some cases, the accessibility instance with the second-highest estimated removal probability may be assigned the second-highest rank, the accessibility instance with the third-highest estimated removal probability may be assigned the third-highest rank, and so on. Finally, the accessibility instance with the lowest estimated removal probability may be assigned the lowest rank.

At operation 618, a prioritized display of a plurality of indications of the plurality of cross account resource accessibility instances is provided, based at least in part on the plurality of weights, to a user of the account. In some examples, the prioritized display may include an ordered list. The order of the ordered list may be based, at least in part, on the plurality of weights. For example, in some cases, a highest weighted (e.g., highest ranked) accessibility instance may be displayed in the top row of the ordered list. Each remaining highest weighted (e.g., highest ranked) accessibility instance may be displayed in the next remaining position of the ordered list, for example descending from the top of the list to the bottom. For example, in some cases, the accessibility instance with the second-highest weight (e.g., rank) may be displayed in the second from the top row of the ordered list, the accessibility instance with the third-highest weight (e.g., rank) may be displayed in the third from the top row of the ordered list, and so on. Finally, the accessibility instance with the lowest weight (e.g., rank) may be displayed in the bottom row of the ordered list. As shown in FIG. 5, a prioritized display 109 may be displayed in a user interface 110 that allows a user to retain or remove the accessibility instances, such as via retain buttons 501-505 and remove buttons 511-515. Operation 618 may include the act of generating a page that includes the prioritized display (e.g., ordered list) of the plurality of indications of the plurality of cross account resource accessibility instances. After this page is generated, it may subsequently (i.e., subsequent to operation 618) be displayed to the user on a display device, such as a computer display screen, touchscreen, computer monitor, etc.

It is noted that, while the above examples relate to instances of cross account resource accessibility, the techniques described herein are not limited to cross account scenarios. Rather, the techniques described herein may be employed in any instances in which a plurality of resources are accessible to a plurality of identities, including when the resources and the identities belong to the same account as one another. Thus, it is noted that any, or all, of the references to cross account resource accessibility instances in FIG. 6 may be modified to refer to resource accessibility instances (which may, or may not, include cross account access scenarios).

Figure 7:
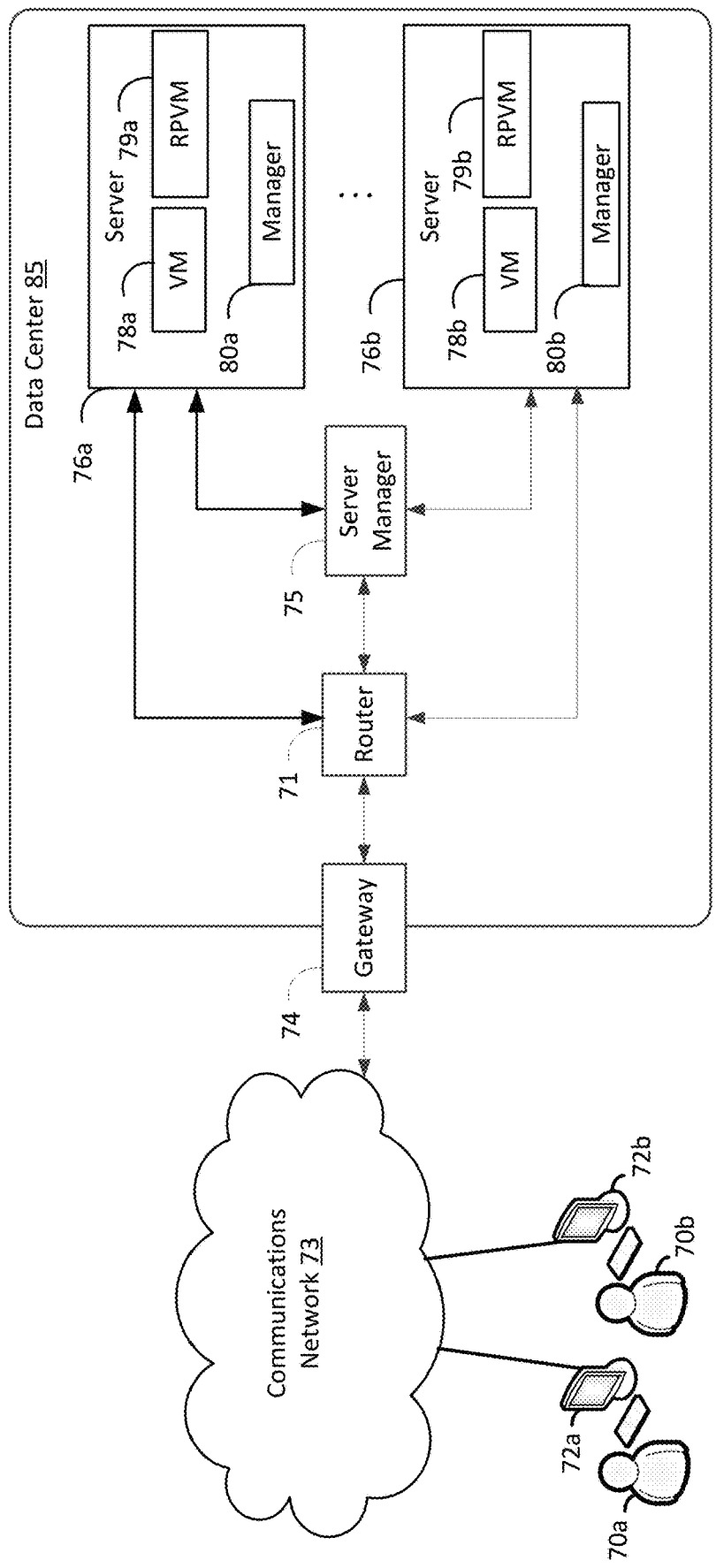
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include removal probability virtual machines (RPVM's) 79*a-b*, which are virtual machines that are configured to execute any, or all, of the removal probability-based weighting techniques described herein, such as to assist in weighting cross account resource accessibility instances based on estimated probabilities of removal as described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
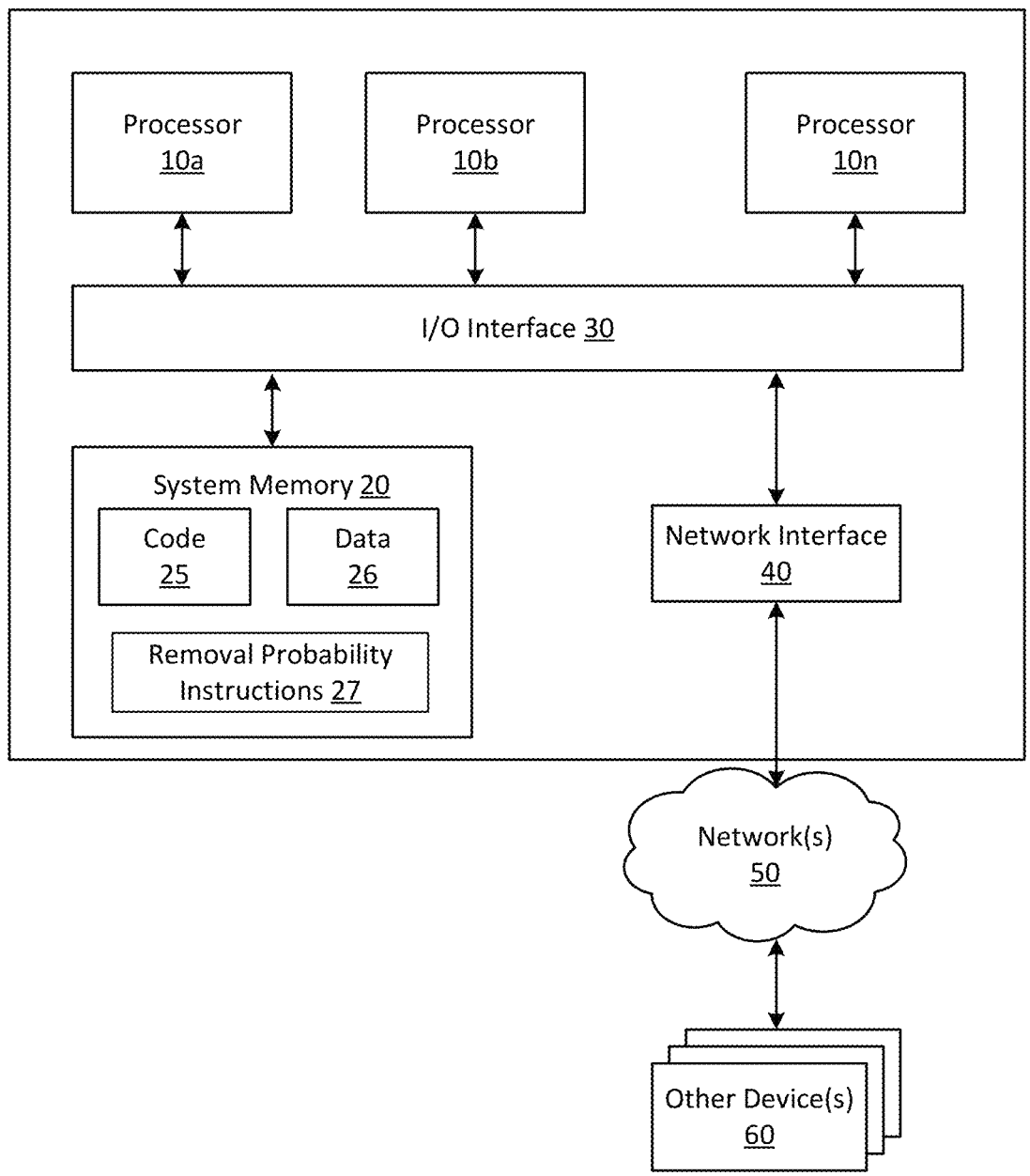
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes removal probability instructions 27, which are instructions for executing any, or all, of the removal probability-based weighting techniques described herein, such as to assist in weighting cross account resource accessibility instances based on estimated probabilities of removal as described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform operations comprising:
identifying a plurality of cross account resource accessibility instances in which a plurality of resources are accessible by a plurality of identities that are external to an account that controls the plurality of resources;
determining, based at least in part on a link prediction analysis, a plurality of estimated occurrence probabilities of a plurality of links between the plurality of resources and the plurality of identities;
determining, based at least in part on the plurality of estimated occurrence probabilities, a plurality of estimated removal probabilities of the plurality of cross account resource accessibility instances;
generating, based at least in part on the plurality of estimated removal probabilities, a plurality of weights for the plurality of cross account resource accessibility instances; and
providing, based at least in part on the plurality of weights, to a user of the account, a prioritized display of a plurality of indications of the plurality of cross account resource accessibility instances.

2. The computing system of claim 1, wherein a first estimated occurrence probability of the plurality of estimated occurrence probabilities corresponds to a first link of the plurality of links between a first identity of the plurality of identities and a first resource of the plurality of resources.

3. The computing system of claim 2, wherein the first estimated occurrence probability is determined based at least in part on a first quantity of resources to which the first identity is linked and a second quantity of identities to which the first resource is linked.

4. The computing system of claim 1, wherein the plurality of estimated removal probabilities are determined based at least in part on an inverse function of the plurality of estimated occurrence probabilities.

5. A computer-implemented method comprising:
identifying a plurality of resource accessibility instances in which a plurality of resources are accessible by a plurality of identities;
determining a plurality of estimated removal probabilities of the plurality of resource accessibility instances;
generating, based at least in part on the plurality of estimated removal probabilities, a plurality of weights for the plurality of resource accessibility instances; and
providing, based at least in part on the plurality of weights, to a user, a prioritized display of a plurality of indications of the plurality of resource accessibility instances.

6. The computer-implemented method of claim 5, further comprising:
determining, based at least in part on a link prediction analysis, a plurality of estimated occurrence probabilities of a plurality of links between the plurality of resources and the plurality of identities, wherein the plurality of estimated removal probabilities are determined based at least in part on the estimated occurrence probabilities.

7. The computer-implemented method of claim 6, wherein a first estimated occurrence probability of the plurality of estimated occurrence probabilities corresponds to a first link of the plurality of links between a first identity of the plurality of identities and a first resource of the plurality of resources.

8. The computer-implemented method of claim 7, wherein the first estimated occurrence probability is determined based at least in part on a first quantity of resources to which the first identity is linked and a second quantity of identities to which the first resource is linked.

9. The computer-implemented method of claim 6, wherein the plurality of estimated removal probabilities are determined based at least in part on an inverse function of the plurality of estimated occurrence probabilities.

10. The computer-implemented method of claim 5, wherein the prioritized display comprises an ordered list.

11. The computer-implemented method of claim 5, the plurality of weights comprise a ranked order of the plurality of resource accessibility instances.

12. The computer-implemented method of claim 5, wherein the plurality of resource accessibility instances are cross account resource accessibility instances in which the plurality of identities are external to an account that controls the plurality of resources.

13. One or more non-transitory computer-readable storage media having stored thereon computing instructions that, upon execution by one or more computing devices, cause the one or more computing devices to perform operations comprising:
identifying a plurality of resource accessibility instances in which a plurality of resources are accessible by a plurality of identities;
determining a plurality of estimated removal probabilities of the plurality of resource accessibility instances;
generating, based at least in part on the plurality of estimated removal probabilities, a plurality of weights for the plurality of resource accessibility instances; and
providing, based at least in part on the plurality of weights, to a user, a prioritized display of a plurality of indications of the plurality of resource accessibility instances.

14. The one or more non-transitory computer-readable storage media of claim 13, wherein the operations further comprise:
determining, based at least in part on a link prediction analysis, a plurality of estimated occurrence probabilities of a plurality of links between the plurality of resources and the plurality of identities, wherein the plurality of estimated removal probabilities are determined based at least in part on the estimated occurrence probabilities.

15. The one or more non-transitory computer-readable storage media of claim 14, wherein a first estimated occurrence probability of the plurality of estimated occurrence probabilities corresponds to a first link of the plurality of links between a first identity of the plurality of identities and a first resource of the plurality of resources.

16. The one or more non-transitory computer-readable storage media of claim 15, wherein the first estimated occurrence probability is determined based at least in part on a first quantity of resources to which the first identity is linked and a second quantity of identities to which the first resource is linked.

17. The one or more non-transitory computer-readable storage media of claim 14, wherein the plurality of estimated removal probabilities are determined based at least in part on an inverse function of the plurality of estimated occurrence probabilities.

18. The one or more non-transitory computer-readable storage media of claim 13, wherein the prioritized display comprises an ordered list.

19. The one or more non-transitory computer-readable storage media of claim 13, the plurality of weights comprise a ranked order of the plurality of resource accessibility instances.

20. The one or more non-transitory computer-readable storage media of claim 13, wherein the plurality of resource accessibility instances are cross account resource accessibility instances in which the plurality of identities are external to an account that controls the plurality of resources.

* * * * *